Sept. 8, 1964 J. K. SHAHEEN 3,147,739
FEEDING DEVICE
Filed July 31, 1962
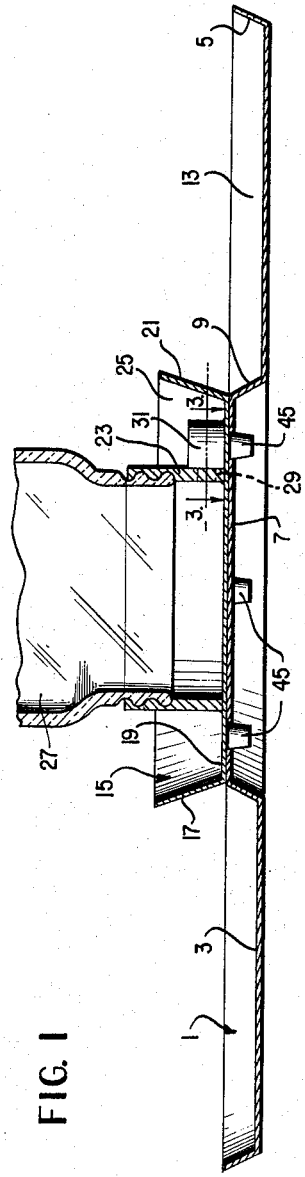
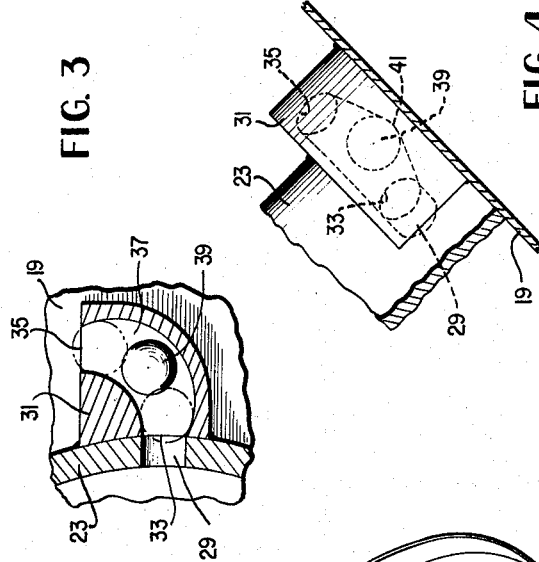
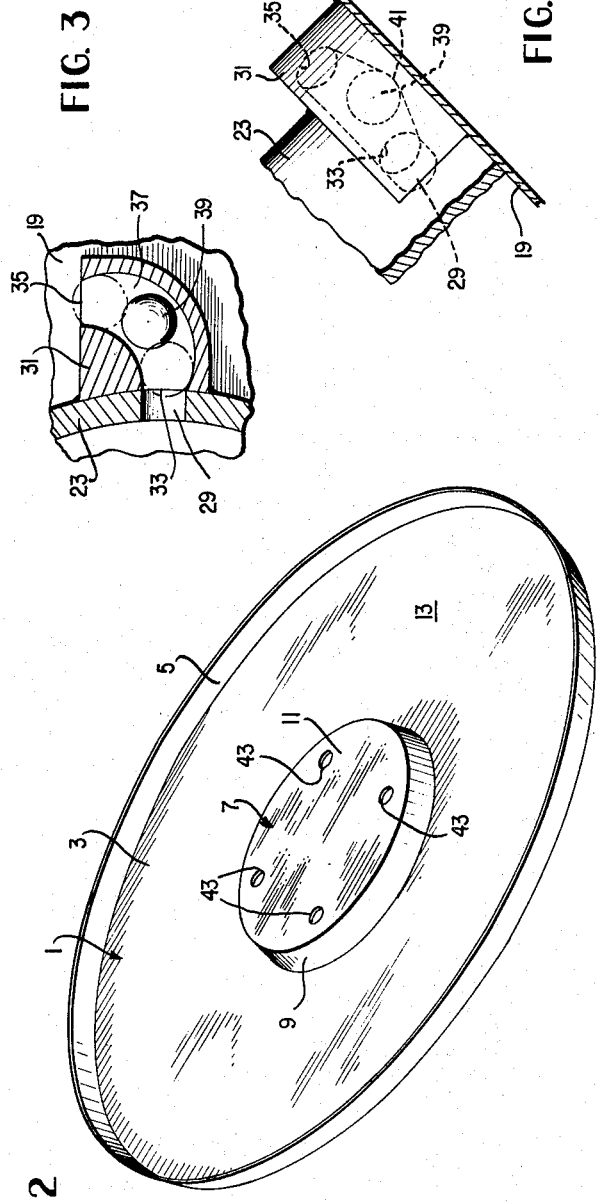
INVENTOR.
JOHN K. SHAHEEN
BY Shanley & O'Neil
ATTORNEYS.

United States Patent Office 3,147,739
Patented Sept. 8, 1964

3,147,739
FEEDING DEVICE
John K. Shaheen, 1105 Cherry Ave. NE., Canton, Ohio
Filed July 31, 1962, Ser. No. 213,761
7 Claims. (Cl. 119—51.5)

The present invention relates to feeding devices, more particularly of the type for young birds such as chicks and poults and the like.

An object of the present invention is the provision of a feeding device for young birds which is also adapted to provide a watering device.

Another object of the present invention is the provision of a feeding device for young birds which encourages the birds to eat more feed.

Still another object of the present invention is the provision of a feeding device for young birds which includes a watering device useful not only when the birds are small but also when they are larger.

Still another object of the present invention is the provision of a feeding device for young birds including a watering device that does not become fouled with the feed and litter.

A still further object of the present invention is the provision of a feeding device for young birds including a watering device which cannot entirely spill.

Finally, it is an object of the present invention to provide a feeding device for young birds which will be relatively simple and inexpensive to manufacture, easy to assemble and disassemble and to fill, empty and clean, and rugged and durable in use.

Other objects and advantages of the present invention will become apparent from a consideration of the following description, taken in connection with the accompanying drawing, in which:

FIGURE 1 is a side cross-sectional view of a feeding device according to the present invention with parts broken away;

FIGURE 2 is a perspective view of the feeding tray portion of a feeding device of the present invention;

FIGURE 3 is an enlarged fragmentary cross-sectional view of that portion of the present invention which prevents spillage of the water, taken on the line 3—3 of FIGURE 1; and FIGURE 4 is a view of the structure of FIGURE 3 and adjacent structure, positioned as would be an orthographic projection.

Referring now to the drawing in greater detail, there is shown a feeding device for small birds such as chicks or poults or the like, comprising an upwardly open feeding tray 1 which may be of metal or plastic or the like but is of thin sheet material preferably molded or stamped to shape. Tray 1 has a flat annular bottom 3 which is bounded outwardly by low, upwardly extending first side walls 5. In the illustrated embodiment, tray 1 is circular and first side walls 5 are also circular. It will be understood, however, that the tray could have a variety of other shapes such as square or rectangular or other polygonal configurations, in which case first side walls 5 would be other than circular.

The central portion of tray 1 is occupied by a raised central portion 7 that is bounded outwardly by second side walls 9, which in the illustrated embodiment are circular and concentric with first side walls 5. Second side walls 9 also form the outer boundary of a flat horizontal top 11 of central portion 7. Top 11 is parallel to but spaced above the plane of bottom 3 a distance equal to the height of second side walls 9. Top 11 is at an elevation at least as great as the upper edges of first side walls 5, and in the illustrated embodiment is coplanar with those edges.

Tray 1 thus provides an annular feed trough 13 bounded outwardly by first side walls 5 and inwardly by second side walls 9, trough 13 being upwardly open and having a width at least several times its height, that is, the distance between first and second side walls 5 and 9 is at least several times the height of first side walls 5 and preferably at least several times the height of second side walls 9 as well. Raised central portion 7 also has a width at least several times its height. Raised central portion 7 is hollow and opens downwardly.

Raised central portion 7 provides a support for a fountain 15 from which young birds may drink water. Fountain 15 includes a base 17 of plastic or metal or the like, having a flat annular bottom 19 which terminates outwardly in upwardly extending third side walls 21. Bottom 19 is bounded toward the center of the fountain by an upwardly extending annular inner wall 23 which with bottom 19 and third side walls 21 forms an upwardly open annular drinking trough 25 disposed entirely about fountain 15.

Water is supplied to trough 25 by means of an inverted open-necked jar 27 that has screw threads formed in the upper outer edge of the jar that are complementary to and screw-threadedly engage screw threads formed on the upper inner edge of inner wall 23, so that jar 27 may be screwed into base 17 in such position that jar 27 is inverted.

The central portion of the bottom of base 17 is closed, so that inner wall 23 forms in effect an upwardly open cup into which water from jar 27 falls when leaving jar 27. A passageway is provided for this water by means of opening 29 that extends through inner wall 23 and thence through a valve 31 that regulates the flow of water from jar 27. Valve 31 has an inlet opening 33 communicating with opening 29 through inner wall 23, and an outlet opening 35, inlet and outlet openings 33 and 35 being interconnected by a fluid passageway 37 that is closable by a ball 39 when jar 27 is tipped too far, as for example when it falls off raised central portion 7. Specifically, inlet and outlet openings 33 and 35 are too small to pass ball 39. Passageway 37 is smallest at and adjacent openings 33 and 35 and largest between those openings. Also, the floor of passageway 37 slopes from each of openings 33 and 35 downwardly toward the other. These downwardly inclined passageway portions meet at a central portion of passageway 37 in an upwardly open partly spherical shallow recess 41 in which ball 39 normally rests.

Fountain 15 is removably secured to tray 1 by means of recesses in the form of openings 43 through top 11 of tray 1, into which project downwardly extending lugs 45 on the underside of base 17 of fountain 15. Openings 43 and lugs 45 thus coact to prevent undesired rotation of the fountain relative to the tray, and also serve to prevent the fountain from slipping off the tray.

In operation, it is necessary only to fill trough 13 with feed such as grain, raised central portion 7 assuring that the feed will be fairly uniformly eaten by the young birds and that no accumulation of old feed will occur in the central region of the tray.

Raised central portion 7 also provides a pedestal to raise fountain 15 above the feed. This assures that chicks will not kick feed into the water in the fountain, and also that the fountain can be set on the tray without having to brush aside feed to make room for it. The positioning of top 11 at least as high as first side walls 5 tends to keep top 11 entirely above the feed so that fountain 15 can be placed on top 11 without interference from the feed.

When fountain 15 is in place on tray 1 in the position shown in FIGURE 1, lugs 45 on the underside of base 17 of fountain 15 extend through openings 43 in flat top 11 of raised central portion 7 of tray 1. In this position, the upper edges of third side walls 21 of fountain 15 are spaced above bottom 3 of tray 1 a short distance such that small birds standing on bottom 3 can drink from trough 25. The distance between those upper edges of third side walls 21 and first side walls of tray 1 is greater than and preferably several times the height of the upper edges of third side walls above bottom 3. This relationship is an important feature of the invention, for it assures that the tray will be so proportioned that to get to the water, the small birds must hop into feed trough 13 and walk through the feed to get to the water. The small birds eat more grain when they have to walk through it to get to the water than they would eat were they able simply to lean over the edge of the feed trough for their feed and get their water elsewhere. The birds thus tend to eat more and to grow faster during the first critical days of feeding.

When the birds have grown somewhat larger, drinking trough 25 can be raised so that it is at a more convenient height for drinking. To do this, it is necessary only to raise the fountain from its seat on the tray so that lugs 45 are no longer disposed in openings 43, turn the fountain about a vertical axis through a small angle, and replace the fountain on the tray with the bottoms of lugs 45 resting on flat top 11.

Moreover, fountain 15 cannot spill much more water than is in drinking trough 25. This is because valve 31 closes the fountain should the fountain be knocked over or otherwise placed in a position in which opening 29 is down. In such a position, ball 39 falls by gravity into outlet opening 35 and closes outlet opening 35 against the escape of water. Normally, ball 39 rests by gravity in recess 41 and tends to roll down the incline of passageway 37 on either side of recess 41 when the fountain is in an upright position. Ball 39 is maintained in passageway 37 because inlet opening 33 and outlet opening 35 are both smaller than ball 39. The flow of water out of jar 27 is not sufficiently great to force ball 39 into outlet opening 35 when the fountain is in the position of FIGURE 1. This is because water will flow out of jar 27 and into drinking trough 25 until it rises to the level of the top of opening 29. Thereafter, the flow of water will cease because there is no opportunity for air to get into jar 27 to displace water from the jar. This limited flow of water through passageway 37 is not enough to maintain ball 39 in outlet opening 35 against the tendency of ball 39 to roll back down into recess 41. It is only when fountain 15 is tipped at a substantial angle from that shown in FIGURE 1 that ball 39 will block outlet opening 35 and keep it closed.

From a consideration of the foregoing disclosure, it will be obvious that all of the initially recited objects of the present invention have been achieved.

Although the present invention has been described and illustrated in connection with a preferred embodiment, it is to be understood that modifications and variations may be resorted to without departing from the spirit of the invention, as those skilled in this art will readily understand. For example, although it is preferred that lugs 45 be on the fountain and openings 43 in the tray, openings 43 could be in the bottom of the fountain and lugs 45 could extend upward from flat top 11 of the tray. Similarly, the recesses provided by openings 43 could be upwardly opening cups closed at their bottom; but this construction is less preferred because feed could get into those cups and interfere with the proper seating of lugs 45. By the same token, lugs 45 could extend upwardly from flat top 11 of tray 1 and the recesses provided by openings 43 could be in the form of downwardly opening cups on the underside of base 17 of fountain 15. These and other modifications and variations are considered to be within the purview and scope of the present invention as defined by the appended claims.

What is claimed is:

1. A feeding and watering device for young poultry, comprising an upwardly open first receptacle having a bottom wall, first side walls, and a raised central portion having a substantially flat top and bounded by second side walls, the first side walls encompassing and being spaced outward from the second side walls a distance at least several times the height of the first side walls, and a water fountain resting on the raised central portion and having third side walls that define an upwardly open second receptacle for water, the third side walls having a height above the bottom of the first receptacle less than the distance between the first and third side walls.

2. A feeding and watering device as claimed in claim 1, the raised central portion being hollow and opening downwardly.

3. A feeding and watering device as claimed in claim 1, the raised central portion being at least as high as the first side walls.

4. A feeding and watering device as claimed in claim 1, the raised central portion being several times as wide as it is high.

5. A feeding and watering device as claimed in claim 1, and means releasably retaining the tray and fountain in assembled relationship against lateral movement relative to each other.

6. A feeding and watering device as claimed in claim 5, the last-named means comprising vertically extending projections on one of the tray and fountain removably disposed in recesses in the other of the tray and fountain.

7. A feeding tray for young poultry comprising an upwardly open receptacle having a unitary bottom surface, peripheral side walls, and a raised substantially flat central portion bounded by side walls, the peripheral side walls being spaced from the raised central portion side walls a distance at least several times the height of the peripheral side walls and the raised substantially flat central portion having a plurality of spaced upwardly-opening lug recesses for removably securing a drinking fountain for young poultry to the raised substantially flat central portion.

References Cited in the file of this patent
UNITED STATES PATENTS

| | | |
|---|---|---|
| 1,254,193 | Beach et al. | Jan. 22, 1918 |
| 1,391,824 | Foster | Sept. 27, 1921 |
| 1,801,932 | Miller | Apr. 21, 1931 |
| 1,874,141 | Sueper | Aug. 30, 1932 |
| 1,994,859 | Langum | Mar. 19, 1935 |
| 2,527,324 | Muehfeld | Oct. 24, 1950 |
| 2,875,729 | Gibson | Mar. 3, 1959 |